United States Patent

Kayatz

[15] 3,705,460
[45] Dec. 12, 1972

[54] MATERIAL COOLING APPARATUS
[72] Inventor: Karl-Heinz Kayatz, Hamburg-Nienstedten, Germany
[73] Assignee: Claudius Peters Aktiengesellschaft
[22] Filed: Jan. 18, 1971
[21] Appl. No.: 107,216

[52] U.S. Cl. .............................34/60, 34/62, 34/164, 263/32 R
[51] Int. Cl. .............................................F26b 19/00
[58] Field of Search ...........................34/64–66, 164, 34/60, 62, 63; 165/86; 263/32 R

[56] References Cited

UNITED STATES PATENTS

| 3,595,543 | 7/1971 | Tresouthick | 263/32 R |
| 3,412,477 | 11/1968 | Kayatz | 34/164 |
| 2,375,487 | 5/1945 | Newhouse | 34/164 X |

FOREIGN PATENTS OR APPLICATIONS

| 445,297 | 6/1927 | Germany | |
| 490,761 | 1/1930 | Germany | |
| 1,137,213 | 12/1968 | Great Britain | 263/32 R |

Primary Examiner—Carroll B. Dority, Jr.
Attorney—Jack L. Prather and Frank H. Thomson

[57] ABSTRACT

A cement clinker cooler for use with a kiln which includes a grate-type recuperation cooler wherein the cooling air is returned to the kiln for use as combustion air. The cooling apparatus also includes a second-stage cooler which may be in the form of an indirect heat exchanger or a radiation cooler or a combination of an indirect heat exchanger and a radiation cooler.

3 Claims, 3 Drawing Figures

PATENTED DEC 12 1972

INVENTOR
*KARL-HEINZ KAYATZ*
BY
*Frank H. Thomson*
*Jack L. Prather*
ATTORNEY

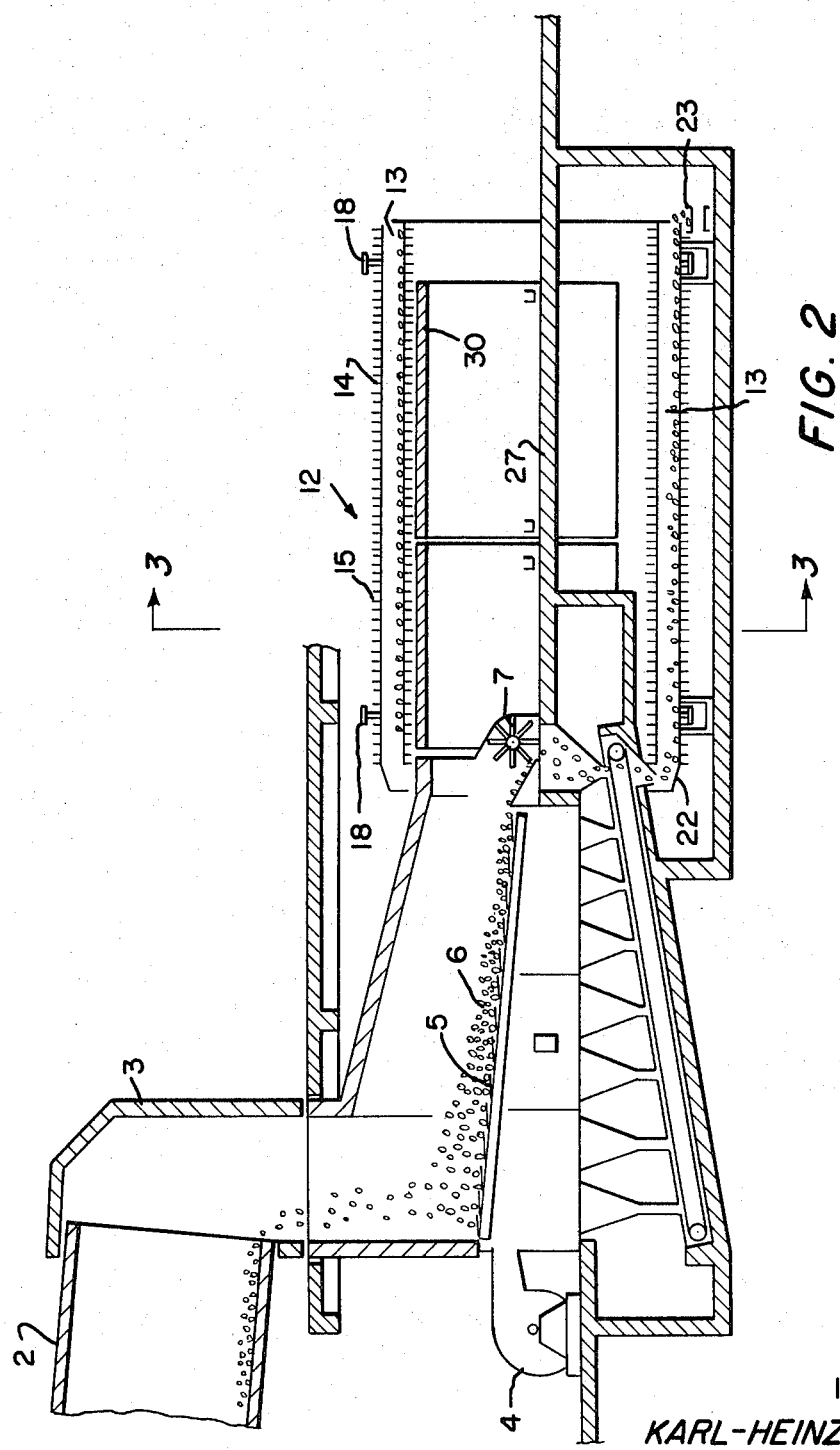

MATERIAL COOLING APPARATUS

BACKGROUND OF THE INVENTION

This invention relates to a two-stage clinker cooler whose first stage consists of a directly working recuperation cooler whose cooling air is piped into the kiln as combustion air.

Such known clinker coolers consist, for example, of two series-connected thrust grating coolers, whereby the highly-heated cooling air of the first one is piped to the kiln, while the cooling air of the second one, which amounts to only low temperatures, is used elsewhere or is blown off into the atmosphere. Direct cooling of the clinker with cooling air entails the disadvantage that the cooling air absorbs dust from the clinker bed and that special filters for dust removal must be provided.

The invention is intended to create a clinker cooler of the kind mentioned in the beginning, a cooler which will require a smaller construction expenditure than the known clinker coolers. The solution, according to the invention, consists in the fact that the second stage is a radiation cooler or an indirect heat exchanger or a combination of an indirect heat exchanger with a radiation cooler.

These characteristics insure that no flowing cooling medium will stream directly through the clinker or will stream over it, to a considerable extent, at least in the second cooler stage, so that no quantities of dust will have to be evacuated from the clinker, quantities which would again have to be extracted from the cooling medium in filters. The elimination of such filters would substantially reduce the cost of a cooler installation.

Indirect clinker coolers such as those shown in German Patent Nos. 445,297 and 490,761 are known. However, these coolers do not provide for two-stage clinker cooling and therefore do not make it possible to utilize the clinker heat for preheating kiln combustion air, which is a basic requirement for the economical operation of cement plant installations. Likewise, they cannot be applied in modern large-scale installations because when we have large volumes of clinker coming directly out of the kiln, they cannot guarantee adequate heat evacuation. Finally, they do not permit the rapid cooling of the clinker coming out of the furnace and this is very important in the quality of the clinker produced. The present-day expert, therefore, does not believe that indirect cooling is suitable for clinker. The present device shows that, contrary to this prejudice, indirect cooling may well offer great advantages for clinker, provided it is used in the manner according to the present invention.

Radiation cooling, which according to the invention may be combined with indirect cooling, or which might even replace the latter, in the view of the expert has so far been considered likewise useless for clinker cooling because radiation cooling generally is considered economical only at high temperature differences. These high temperature differences do occur in the first cooler area in the clinker coming directly out of the furnace; but radiation cooling there cannot produce the desired rapid cooling. Quite surprisingly, the second cooling stage proves to be very helpful here, according to the discoveries made in this invention, although the temperatures there are considerably lower than in the first stage.

SUMMARY

It is, therefore, the principal object of this invention to provide a novel heat exchanger apparatus which substantially eliminates the necessity of using filters to clean the material cooling air.

It is another object of this invention to provide a navel clinker cooler which lends itself to a rapid initial cooling of the clinker and eliminates the necessity of using filters to clean the cooling air.

It is a still further object of this invention to provide a clinker cooler which permits the cooling air which is heated by the hot clinker to be used as combustion air and which eliminates the necessity of using air filter devices.

The foregoing and other objects of the invention are carried out by providing a two-stage clinker cooler comprising a first cooler means including means for passing a cooling gas through the clinker and means for conducting said cooling gas to a furnace after it has passed through the clinker and a second cooler means for receiving clinker from said first cooler means, said second cooler means being isolated from the means for passing a cooling gas through the clinker of said first cooler means.

The indirect cooler can, according to the invention, be made up of a plurality of pipes arranged along a cylinder casing around a joint axis of rotation. These pipes contain worm gears or similar devices, in the known manner, which move the material to be cooled amid continuous rotation. The material gives its heat off to the pipe wells which, in turn, radiates their heat or gives the heat off to the cooling air or the cooling liquid which can be conducted past the pipes for their cooling in the known manner.

The radiation cooling section is preferably made up by the conveyor device on which the clinker can radiate its heat into the environment while it lies there. According to the invention, radiation receivers can also be provided. These radiation receivers in turn are cooled. For example, these receivers might consist of a water-cooled, blackened surface above and, if necessary, also to the side of a conveyor device.

The conveyor device can be provided with installations bringing about a moderate movement of the clinker bed to be cooled, so that other parts of the clinker bed can constantly come to the surface and radiate their heat there. Cooling devices can also be provided in the conveyor device so that a part of the heat will be evacuated to the top through radiation and another part will be evacuated downward through heat conduction. In each case a situation is avoided in which the cooling air must be blown through the clinker bed, which means that the fans and the associated air ducts, as well as the filters for the removal of dust from the air, can be eliminated.

BRIEF DESCRIPTION OF THE DRAWINGS

The invention will be described in connection with the annexed drawings wherein:

FIG. 2 is a clinker cooler with indirectly working cooler as second cooler stage in a longitudinal cross-section.

DESCRIPTION OF THE PREFERRED EMBODIMENTS

Figure 3:
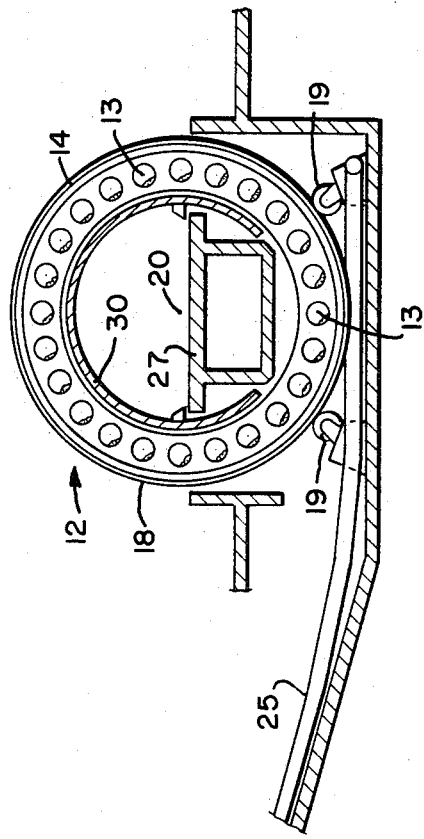
FIG. 3 is a cross-section along line 3—3 in FIG. 2.

As the first cooler stage, both versions use an inclined-grate cooler 1, such as that shown in U.S. Pat. No. 3,358,385, to which the material is supplied from the furnace 2 (not shown in FIG. 1) through conduit 3. A blower 4 passes cooling air through the grates 5 of the cooler 1 and through the clinker bed 6 lying on it and this air then is moved into the furnace as combustion air. At the end of the first cooler stage, a crusher or clinker breaker 7 is provided for reducing the size of the coarse pieces of clinker. The clinker, which in this area is cooled down to about 600° C. or less, in the example shown in FIG. 1, drops down to a conveyor device 9, while in the version according to FIGS. 2 and 3, it drops into an indirect cooler 12.

Figure 1:
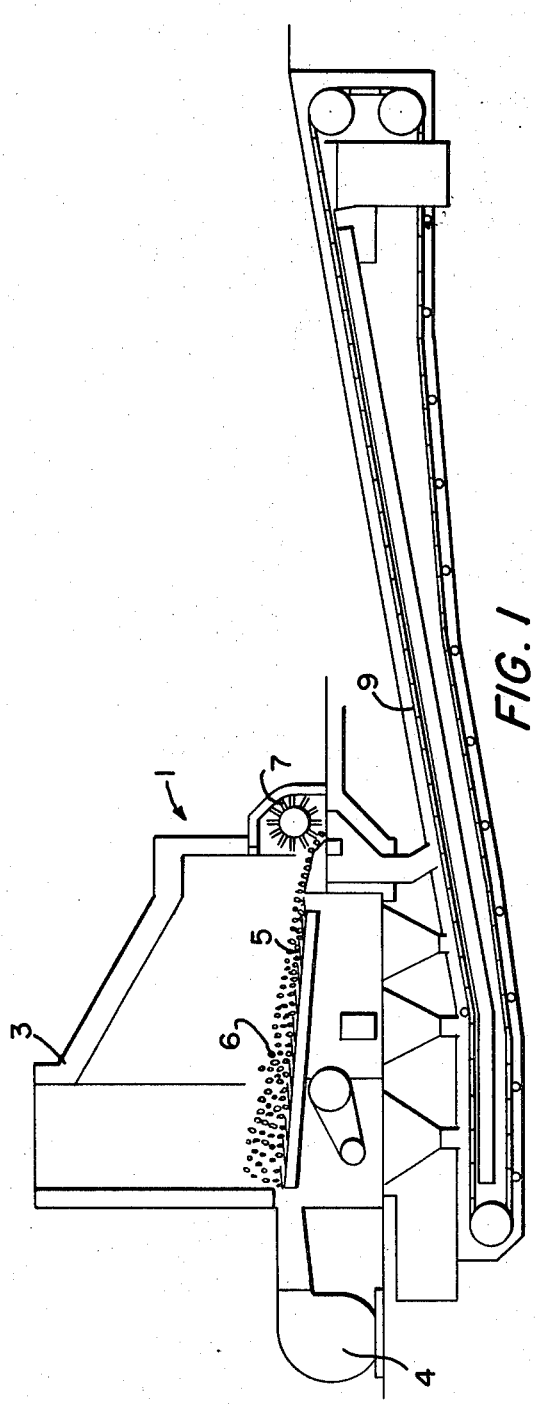
FIG. 1 is a clinker cooler with a second cooler stage, designed as a radiation cooler, in a schematic side view.

The conveyor device 9 in the example in FIG. 1 extends below the grates 5 in order to catch clinker falling down between the grate plates and extends over a distance sufficient for cooling the clinker in a free environment. The clinker, lying on the conveyor 9, radiates its heat into the surrounding environment. The conveyor device can, for example, be a plate chain or the like.

In the example in FIGS. 2 and 3, the indirect cooler 12 consists of a large number of pipes 13 which are arranged along a circular cylinder and which are provided with components which promote the conveyance and movement of the material as well as the heat transfer from the material to the pipe walls. The pipes are then closed by a drum 14 which may be provided with ribs 15 which promote heat transfer and radiation. This drum can be omitted if other devices are provided for positioning and holding the pipes 13.

Bearing rings 18 surround the drum and the pipes and run on rollers 19 so that the pipes 13 can be turned by means of a drive, not shown, around the common center 20.

On the charge side, the drum has an extension 22 which has a slightly conical shape and which catches the material falling from the first cooling stage and moves it to the pipes. A known conveyor device 23 catches the fine material dropping from cooler 1 and conveys such material to the conical part 22. By means of a conveyor 25, the material, which has run through the pipes 13, is caught at the end of the pipes.

In cooler 12, a platform 27 has been provided for permitting access to the interior of the cooler 1 and the crusher 7. In order to reduce heat radiation from the pipes 13 to the platform, a heat shield 30 has been provided. This heat shield and other parts of cooler 12 can be water-cooled by any suitable means (not shown). If only the shield is cooled, then it acts as a receiver for the heat radiation coming form the pipes and thus promotes heat evacuation. Cooling water or a cooling air flow can be passed through or around the pipes or tubes 13 by suitable means such as a fan (not shown).

From the foregoing, it should be apparent that the objects of this invention have been carried out. Immediately after the clinker leaves the kiln 2, it is rapidly cooled a certain amount by a cooling gas passing through the clinker as in the first cooler means 1. All of the air which passes through this hot clinker is returned to the kiln or furnace 2 and is used as combustion air. Thus, the advantage of present grate coolers is maintained. The second cooler means is either an indirect heat exchanger or a radiation cooler. This cooler is used to cool the clinker to a temperature which permits it to be handled. With prior apparatus, cooling air is blown through the hot clinker until it is cooled to a temperature which permits handling. Although some of the air was returned to the kiln as combustion air, most had to be sent to a filter to remove dust entrained from the clinker. By using the cooler of the present invention, air is not blown through the clinker and thus does not pick up dust from the clinker. This eliminates the necessity of employing filters, such as baghouse or other high efficiency and costly filters, to collect the dust. Thus, it should be apparent that the advantages of prior clinker cooling apparatus have been maintained and the disadvantages eliminated.

I claim:

1. A two-stage clinker cooler comprising a first cooler means including means for passing a cooling gas through the clinker and means for conducting said cooling gas to a furnace after it has passed through the clinker, and a second cooler means for receiving clinker from said first cooler means, said second cooler means being an indirect heat exchanger and being isolated from the means for passing a cooling gas through the clinker of said first cooler means, and clinker breaker means positioned between said first and second cooler means.

2. The clinker cooler of claim 1 wherein said indirect heat exchanger includes a plurality of pipes through which clinker to be cooled moves and said pipes are arranged around a cylindrical casing.

3. The clinker cooler of claim 2 further comprising means for rotating said casing.

* * * * *